United States Patent [19]
Okada et al.

[11] Patent Number: 5,351,690
[45] Date of Patent: Oct. 4, 1994

[54] ULTRASONIC DIAGNOSTIC APPARATUS CAPABLE OF PERFORMING SWITCHING BETWEEN SINGLE BEAM RECEPTION AND SIMULTANEOUS PARALLEL BEAM RECEPTION

[75] Inventors: Kazutaka Okada, Iwatsuki; Akira Sasaki, Ichikawa; Minoru Yoshida, Kashiwa, all of Japan

[73] Assignee: Hitachi Medical Corporation, Tokyo, Japan

[21] Appl. No.: 165,918

[22] Filed: Dec. 14, 1993

[30] Foreign Application Priority Data

Dec. 18, 1992 [JP] Japan .................................. 4-354907

[51] Int. Cl.⁵ .............................................. A61B 8/00
[52] U.S. Cl. ................................ 128/661.01; 73/609; 73/626
[58] Field of Search ................. 73/596, 597, 625, 609, 73/626; 128/660.07, 660.08, 661.01

[56] References Cited
U.S. PATENT DOCUMENTS 5,203,336 4/1993 Iida et al. ..................... 128/660.07
5,263,004 11/1993 Larson, III ..................... 128/661.01
5,271,276 12/1993 Katakura et al. ............... 128/661.01

*Primary Examiner*—George Manuel
*Attorney, Agent, or Firm*—Antonelli, Terry, Stout & Kraus

[57] ABSTRACT

An ultrasonic diagnostic apparatus has a probe having a plurality of channels, a receiving circuit for dividing receiving signals from the probe to deliver them in the form of "K" (K being an integer which is 2 or more) blocks each having a predetermined number of channels, a selector circuit for selecting signals corresponding to respective ones of the blocks from output signals of the receiving circuit and delivering the selected signals, a signal distributor for selecting the output signals of the receiving circuit in the mode of single beam reception and selecting the output signals of the selector circuit in the mode of simultaneous parallel beam reception, "K" delay circuits connected to outputs of the signal distributor and each having the predetermined channels, and a switch for switching the "K" delay circuits to series connection in the mode of single beam reception and switching the "K" delay circuits to parallel connection in the mode of simultaneous parallel beam reception.

6 Claims, 3 Drawing Sheets

ULTRASONIC DIAGNOSTIC APPARATUS CAPABLE OF PERFORMING SWITCHING BETWEEN SINGLE BEAM RECEPTION AND SIMULTANEOUS PARALLEL BEAM RECEPTION

BACKGROUND OF THE INVENTION

The present invention relates to an ultrasonic diagnostic apparatus for providing a tomographic image of a region of interest of a subject or an object under measurement by utilizing ultrasonic waves and more particularly to an ultrasonic diagnostic apparatus in which transmission and reception of ultrasonic waves can be effected by means of a probe of multi channel and switching between the single beam reception and the simultaneous parallel beam reception can be ensured to perform signal processings.

As shown in FIG. 1, a conventional ultrasonic diagnostic apparatus comprises a probe 1 for transmitting and receiving ultrasonic waves to and from a subject, an ultrasonic signal transmitting and receiving unit 2 for amplifying receiving signals from the probe 1 and providing them with predetermined delays so as to perform receiving beam forming, an image processing circuit 3 for applying predetermined processings to output signals from the ultrasonic signal transmitting and receiving unit 2 so as to prepare an image signal, and an image display unit 4 for displaying the image signal from the image processing circuit 3. The ultrasonic signal transmitting and receiving unit 2 includes a transmitting circuit 5 for generating ultrasonic transmitting signals and applying them to the probe 1 to drive the same, a receiving and amplifying circuit 6 for receiving and amplifying reflected echo signals returning from the living body and received by the probe 1, and a receiving beam forming circuit 8 having a delay circuit 7 which provides receiving signals of respective channels delivered out of the receiving and amplifying circuit 6 with predetermined delays and adds the respective channel signals together to bring the channel signals into in-phase so as to accomplish receiving focusing.

Then, output signals from the receiving beam forming circuit 8 are put together to form a single channel signal, this signal is sent to the image processing circuit 3 so as to be subjected to signal processings such as logarithmic compression and detection and an image signal thus obtained is applied to the image display unit 4, thereby displaying an ultrasonic tomographic image. The apparatus of the above circuit construction is called a single beam reception type apparatus, in which through one transmission of ultrasonic beams from the probe 1 effected in a scanning direction for the one transmission in a sector scanning image shown in FIG. 2, one receiving signal is obtained and so only one scanning line is allowed to be obtained.

There is on the other hand another conventional example of ultrasonic diagnostic apparatus as shown in FIG. 3 wherein in a receiving beam forming circuit 8 of an ultrasonic signal transmitting and receiving unit 2, two delay circuits 7a and 7b are connected in parallel and succeeding two image processing circuits 3a and 3b are also connected in parallel. The apparatus of the above construction is called a simultaneous parallel beam receiving type apparatus, in which through one transmission of ultrasonic beams from probe 1 effected in a scanning direction for the one transmission in a sector scanning image shown in FIG. 4, two receiving signals are obtained and so two scanning lines returning from portions which are oppositely displaced from each other by a small angle are allowed to be obtained.

Under the condition described as above, the number of channels is related to the single beam reception type apparatus shown in FIG. 1 and the simultaneous parallel beam reception type apparatus shown in FIG. 3 as follows.

More particularly, in the observation of hearts in which the simultaneous parallel beam reception is the most effective, a probe must be applied between ribs and therefore the size of the probe in use cannot be large and the number of channels cannot be increased. On the other hand, since in the observation of the other organs than the heart a high frame rate as in the case of the heart observation is not required, the single beam reception is enough for practical use and improvements in acoustic characteristics are rather of importance. Therefore, in this case, there needs the multi channel. Recently, it is general to improve acoustic characteristics by increasing the number of channels used in one transmission/reception. Taking sector probes, for instance, a probe of 64 channels is generally used in the heart observation and a probe of the double of channels, that is, 128 channels is used in the observation of bellies devoid of obstructive bones.

With the trend toward the multi channel scheme as above, when a probe 1 of, for example, 128 channels is used in the single beam reception type apparatus shown in FIG. 1, receiving and amplifying circuit 6 and delay circuit 7 each being of 128 channels are necessarily used at the expense of increased cost and increased size in expectation of improvements in acoustic characteristics. However, in the simultaneous parallel beam reception type apparatus shown in FIG. 3, for the probe 1 of 128 channels, a single receiving and amplifying circuit 6 of 128 channels suffices but two delay circuits 7a and 7b each being of 128 channels are required. In this case, the delay circuits 7a and 7b of increased channels of 128 lead to an increase in size and cost and besides the number of channels of the two amounts up to 256 in total, with the result that the size of the apparatus as a whole is increased and the cost thereof is increased significantly.

Since the performance of the delay circuits 7a and 7b dominate the image quality, in other words, the performance of the ultrasonic diagnostic apparatus, high performance is required of the delay circuits. Accordingly, the delay circuit becomes very expensive and an increase in the number of channels of the delay circuit is of a significant problem from the standpoint of cost reduction.

SUMMARY OF THE INVENTION

The present invention intends to cope with the above problems and it is an object of the present invention to provide an ultrasonic diagnostic apparatus which can permit switching between the single beam reception and the simultaneous parallel beam reception without increasing the number of channels of delay circuits in use.

To accomplish the above object, according to the present invention, in an ultrasonic diagnostic apparatus comprising a probe of multi channel incorporating many transducers in array and operative to transmit and receive ultrasonic waves to and from a subject, an ultrasonic signal transmitting and receiving unit for supplying ultrasonic transmitting signals to the probe and amplifying receiving signals from the probe and providing them with predetermined delays so as to effect receiving beam forming, an image processing circuit for applying predetermined processings to output signals from the ultrasonic signal transmitting and receiving unit to form an image signal, and an image display unit for displaying the image signal from the image processing circuit, a transmitting circuit and a receiving and amplifying circuit included in the ultrasonic signal transmitting and receiving unit are each divided, in advance, into a plurality stages ("K" stages) each being of a predetermined number of channels, there are provided on the output side of the receiving and amplifying circuit a channel selector unit for selecting blocks each being of partial channels from the total channels and a channel signal distributor unit for passing therethrough either signals of the blocks of partial channels selected by the channel selector unit or signals of the total channels, and there are provided, in the receiving beam forming circuit, delay circuits of a number of channels corresponding to the predetermined channel number and a connection switch unit for performing switching between the series connection and the parallel connection of the delay circuits.

With the above construction, the single beam reception and the simultaneous parallel beam reception can be switched therebetween and used without increasing the number of channels of the delay circuits.

Thus, even in the mode of simultaneous parallel beam reception, the total number of channels of a plurality of delay circuits can be equal to the total channel number of each of the probe of multi channel and receiving and amplifying circuit in use to prevent the delay circuits from being increased in size and the apparatus as a whole can be prevented from being increased in size and cost.

DESCRIPTION OF THE PREFERRED EMBODIMENTS

Figure 1:
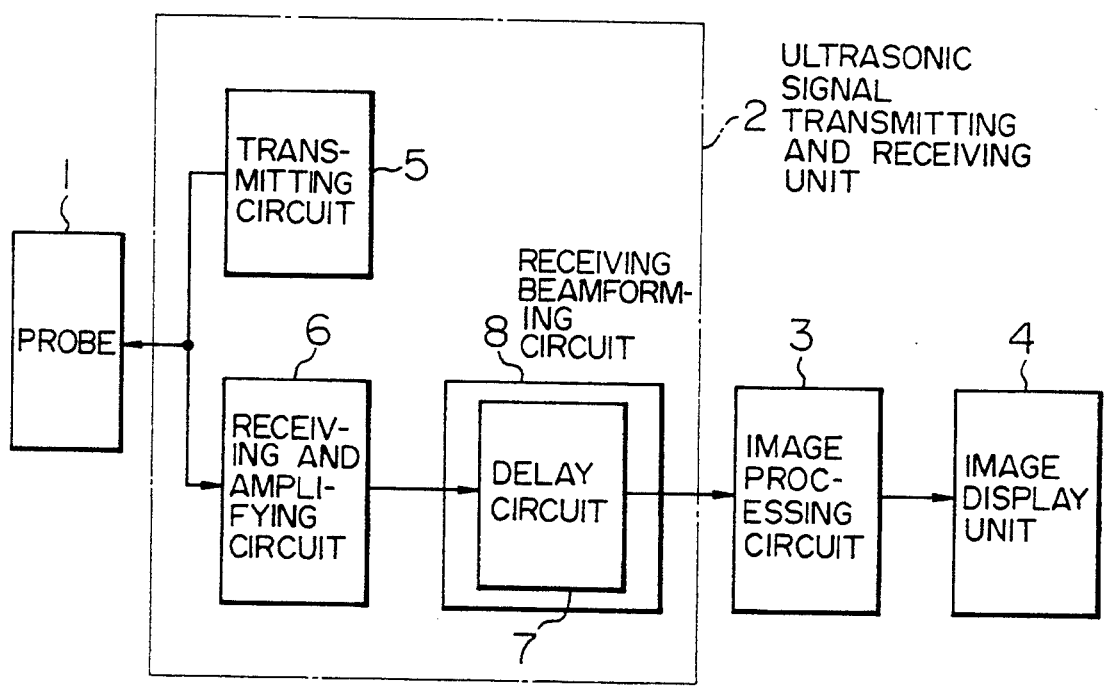
FIG. 1 is a block diagram showing a conventional ultrasonic diagnostic apparatus of single beam reception type.
Figure 2:
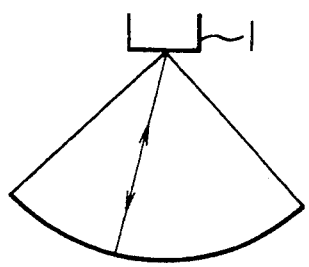
FIG. 2 is a diagram for explaining a scanning line direction obtained through one transmission of a sector scanning image in the single beam reception type apparatus.
Figure 3:
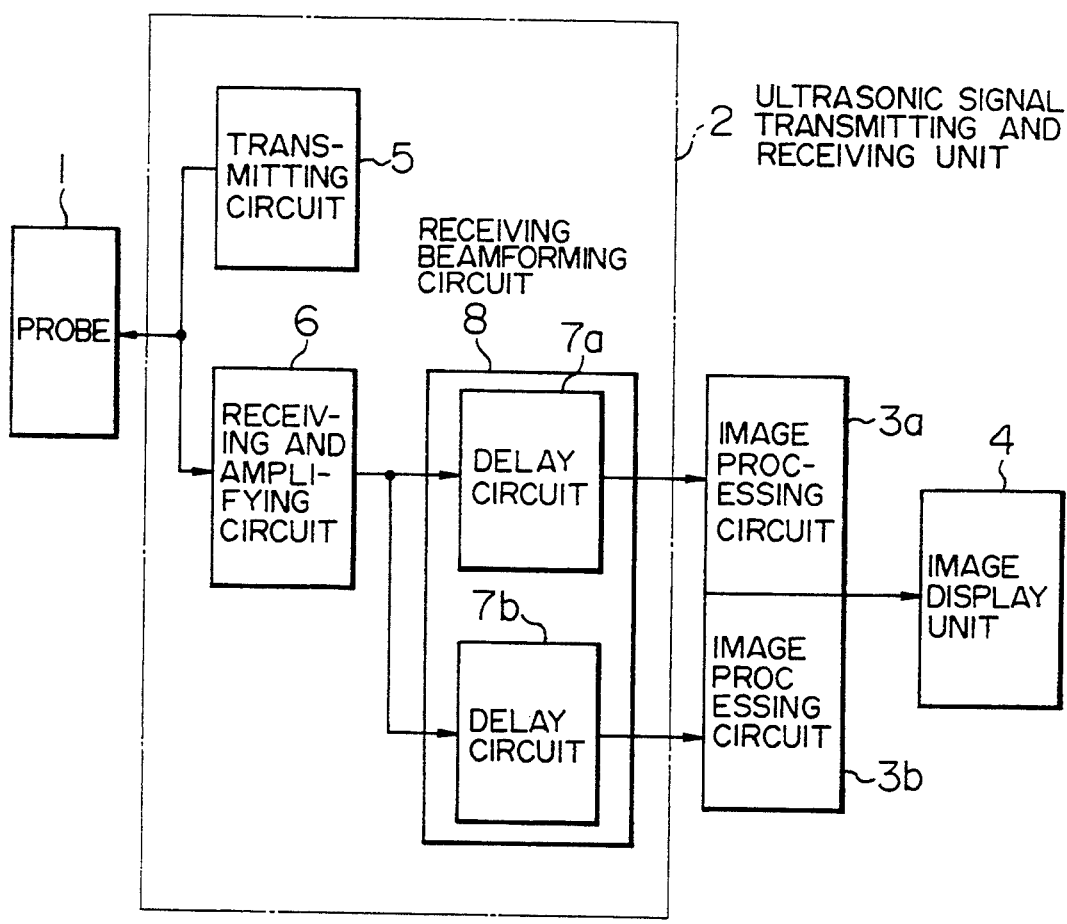
FIG. 3 is a block diagram showing a conventional ultrasonic diagnostic apparatus of simultaneous parallel beam reception type.
Figure 4:
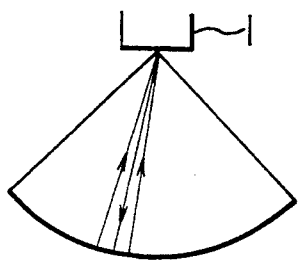
FIG. 4 is a diagram for explaining scanning line directions obtained through one transmission of a sector scanning image in the simultaneous parallel beam reception type.

The present invention will be described in detail by way of example hereunder with reference to the accompanying drawings. Throughout the conventional examples and an illustrated embodiment of the present invention, units for performing the same functions are designated by the same reference numerals.

Figure 5:
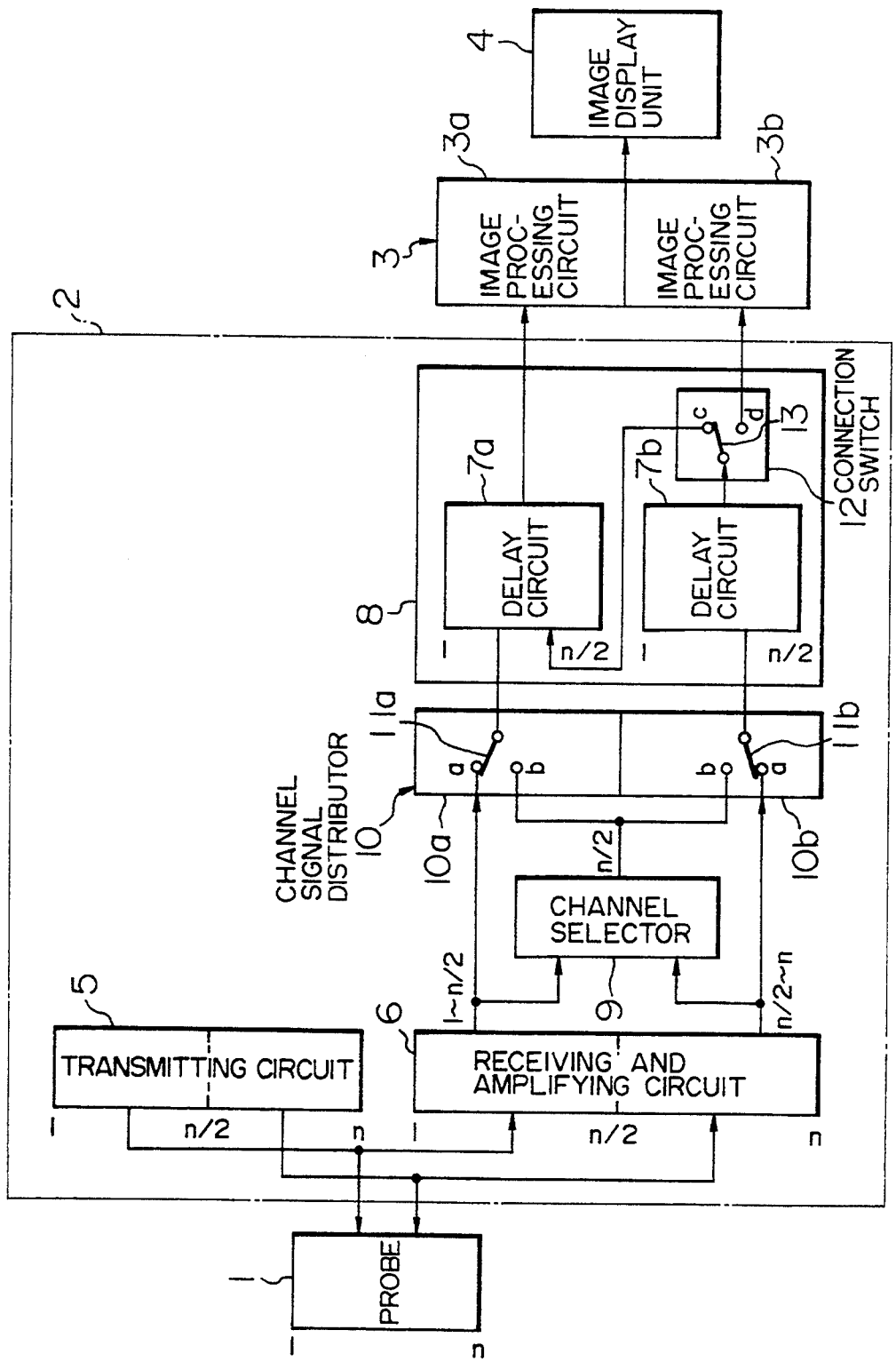
FIG. 5 is a block diagram showing an embodiment of an ultrasonic diagnostic apparatus according to the present invention.

FIG. 5 is a block diagram showing an embodiment of an ultrasonic diagnostic apparatus according to the invention. In the ultrasonic diagnostic apparatus, a probe of multi channel is used, and switching between the single beam reception and the simultaneous parallel beam reception is effected to obtain a tomographic image of a region of interest of a subject or an object under measurement. As shown in FIG. 5, the apparatus comprises a probe 1, an ultrasonic signal transmitting and receiving unit 2, an image processing circuit 3 and an image display unit 4. The probe 1 is adapted to transmit and receive ultrasonic waves to and from a subject and internally, it incorporates transducers of, example, 128 channels arrayed in the form of a long strip, though not shown, to serve as generation sources of ultrasonic signals and receive reflected echoes returning from the living body. Each of the transducers converts an ultrasonic transmitting signal into an ultrasonic wave through electro-acoustic conversion and converts a reflected echo into a receiving signal.

The ultrasonic signal transmitting and receiving unit 2 is adapted to supply ultrasonic transmitting signals to the probe 1, amplify receiving signals from the probe 1 and provide amplified receiving signals with predetermined delays and it includes a transmitting circuit 5, a receiving and amplifying circuit 6, a channel selector 9, a channel signal distributor 10 and a receiving beam forming circuit 8. The transmitting circuit 5 supplies ultrasonic transmitting signals to the probe 1 to drive the same and more specifically, it generates ultrasonic transmitting signals, provides the ultrasonic transmitting signals with predetermined delays and applies the thus delayed ultrasonic transmitting signals to the probe to accomplish the transmitting focusing. The number of channels of the transmitting circuit is set to be equal to a maximum channel number (for example, 128 channels) of the probe 1 and its total channels are divided, in advance, into a plurality of stages ("K" stages). For example, on the assumption that the total channel number n is 128, the total channels are divided into two stages ("K"=2) of which one is associated with 1 to n/2 (=64) channels and the other is associated with n/2 to n channels. The receiving and amplifying circuit 6 is adapted to receive and amplify receiving signals in the form of electric signals converted from reflected echoes received by the probe 1, having its channel number which is equal to the maximum channel number (for example, 128) of the probe 1 and its total channels which are also divided, in advance, into a plurality of stages ("K" stages). For example, on the assumption that the total channel number is n, the total channels are divided into two stages which one is associated with 1 to n/2 channels and the other is associated with n/2 to n channels.

The channel selector 9 serves as means for selecting partial channels from the total channel signals delivered out of the receiving and amplifying circuit 6 and may be constructed of, for example, a multiplexer. The channel selector 9 receives 1 to n/2 channel signals from the preceding stage of the receiving and amplifying circuit 6 and n/2 to n channel signals from the succeeding stage to select, as desired, respective ones of two blocks each being of partial signals of half the total n channels, that is, n/2 channels in this example from the total n channels. The channel signal distributor 10 is adapted to pass therethrough either the two blocks each being of partial channel signals selected by the channel selector 9 or the total channel signals before selection and it is divided into a preceding distributor 10a and a succeeding distributor 10b which are internally provided with switches 11a and 11b, respectively, each switch being transferable between contacts a and b. With each of the switches 11a and 11b transferred to the contact b, each switch is connected to channel selector 9 and the two blocks each being of partial channel (n/2 channels) signals selected by the channel selector 9 is sent to the receiving beam forming circuit 8 to be described later and with each of the switches 11a and 11b transferred to the contact a, the channel selector 9 is disconnected and these switches are connected to the preceding and succeeding stages of the receiving and amplifying circuit 6, so that the 1 to n/2 channel signals and n/2 to n channel signals, that is, the total channel signals are sent to the receiving beam forming circuit 8.

The receiving beam forming circuit 8 carries out receiving beam forming by providing receiving signals of respective channels from the receiving and amplifying circuit 6 with predetermined delays to bring the receiving signals into in phase and internally it incorporates a plurality of delay circuits 7a and 7b each of which receives receiving signals delivered out of the channel signal distributor 10, provides the receiving signals with predetermined delays and adds the signals of respective channels together, and a connection switch 12 which performs switching between series connection and parallel connection of the delay circuits 7a and 7b. One delay circuit 7a is connected to the output of the aforementioned preceding distributor 10a and the other delay circuit 7b is connected to the output of the succeeding distributor 10b, the number of channels of each delay circuit being n/2. The connection switch 12 is connected to the output of the other delay circuit 7b and internally it incorporates a switch 13 which is transferable between contacts c and d. With the switch 13 transferred to the contact c, the two delay circuits 7a and 7b are connected in series and with the switch 13 transferred to the contact d, the two delay circuits 7a and 7b are connected in parallel.

The image processing circuit 3 is adapted to receive an output signal from the receiving beam forming circuit 8 and perform processings such as logarithmic compression and detection of the signal to prepare an image signal and it includes two circuits 3a and 3b in parallel connection respectively associated with the plurality of delay circuits 7a and 7b. Further, the image display unit 4 is adapted to receive the image signal delivered out of the image processing circuits 3a and 3b to display an ultrasonic tomographic image and it is constructed of, for example, a television monitor.

The operation of the ultrasonic diagnostic apparatus constructed as above will now be described. Firstly, the transmitting circuit 5 generates ultrasonic transmitting signals and sends them to the probe 1. Then, many transducers in the probe 1 are driven to emit ultrasonic waves to a subject and the ultrasonic waves are reflected in the subject to provide echoes which in turn are received by corresponding transducers in the probe 1. Receiving signals from the probe 1 are then applied to the receiving and amplifying circuit 6 and amplified thereby. The amplified receiving signals are then supplied to the following channel selector 9 and channel signal distributor 10. At that time, 1 to n/2 channel signals from the preceding stage of the receiving and amplifying circuit 6 are applied to the channel selector 9 and the preceding distributor 10a, and n/2 to n channel signals from the succeeding stage are applied to the channel selector 9 and the succeeding distributor 10b. Then, the channel selector 9 selects as desired respective ones of two blocks each being of, for example, half the total input n channel signals, that is, n/2 channel signals from the total n channel signals.

In the mode of single beam reception, the switch 11a in the preceding distributor 10a of the channel signal distributor 10 and the switch 11b in the succeeding distributor 10b of the channel signal distributor 10 are each transferred to the contact a and the switch 13 of the connection switch 12 is transferred to the contact c. Then, 1 to n/2 channel signals directly delivered out of the preceding stage of the receiving and amplifying circuit 6 and n/2 to n channel signals directly delivered out of the succeeding stage are passed through the switches 11a and 11b in the channel signal distributor 10, respectively, so as to be applied to the two delay circuits 7a and 7b in the receiving beam forming circuit 8, respectively. Since the two delay circuits 7a and 7b are connected in series through the contact c of the switch 13, the delay circuits 7a and 7b as a whole correspond to n/2+n/2=n channels and receiving signals of the total n channels which are delivered out of the receiving and amplifying circuit 6 are delayed by means of the delay circuits 7a and 7b of n channels so as to be subjected to beam forming addition. Through this, receiving beam forming can be carried out under the condition that the number of channels is increased (for example, n=128 channels) for the purpose of improving acoustic characteristics.

The signals of n channels subject to the beam forming addition are delivered out of one delay circuit 7a and then sent to the image display unit 4 through one image processing circuit 3a, so that an ultrasonic tomographic image is displayed on the screen of the image display unit 4.

In the mode of simultaneous parallel beam reception, the switch 11a in the preceding distributor 10a of the channel signal distributor 10 and the switch 11b in the succeeding distributor 10b are each transferred to the contact b, and the switch 13 in the connection switch 12 is transferred to the contact d. Then, 1 to n/2 channel signals from the preceding stage of the receiving and amplifying circuit 6 and n/2 to n channel signals from the succeeding stage are both interrupted at the channel signal distributor 10 and two blocks each being of n/2 channel signals from the channel selector 9 are applied to the two delay circuits 7a and 7b in the receiving beam forming circuit 8, respectively, through the switches 11a and 11b in the channel distributor 10. Since under this condition the two delay circuits 7a and 7b are in parallel connection because of opening of the contact c and closure of the contact d of the connection switch 12, the 1 to n/2 channel signals and n/2 to n channel signals which are both applied through the channel distributor 10 are delayed in simultaneous parallel fashion by means of the two delay circuits 7a and 7b each being of n/2 channels so as to be subjected to beam forming addition. In this manner, two receiving signals can be obtained simultaneously through one transmission of ultrasonic beams from the probe 1 and an image at a high frame rate can be obtained.

The two blocks each being of n/2 channel signals subject to the beam forming addition are delivered out of the delay circuits 7a and 7b, respectively, and then sent to the image display unit 4 through the two image processing circuits 3a and 3b, respectively, so that an ultrasonic tomographic image is displayed on the screen of the image display unit 4.

While in the foregoing description the total channel number of the probe 1, transmitting circuit 5 and receiving and amplifying circuit 6 is set, as an example, to 128 but this is not limitative and the number of channels may be different from the above. The simultaneous parallel beam reception has been described by referring to the case where two receiving signals are obtained simultaneously through one transmission of ultrasonic beams but the present invention is not limited thereto and the construction of the channel selector 9, channel signal distributor 10 and connection switch 12 may be changed and the number of delay circuits (7a and 7b in the foregoing embodiment) may be increased to permit three or more receiving signals be obtained simultaneously through one transmission of ultrasonic beams.

For example, in the case where P (P>2) receiving signals are obtained simultaneously, the transmitting circuit 5 and receiving and amplifying circuit 6 shown in FIG. 5 are driven while their total channel number n being divided into P blocks each being of n/P channels. The channel selector 9 is so constructed as to select n/P channels of any one block. P delay circuits each being of n/P channels are provided and n/P channel signals of the same block selected by the channel selector 9 are inputted to corresponding one of the P delay circuits. Outputs from the delay circuits are inputted to P independent image processing circuits respectively, to form an image signal.

In the mode of single beam reception, the P delay circuits are connected in series. Outputs from the respective stages of the receiving and amplifying circuit 6 are applied directly, not through the channel selector 9, to the P delay circuits, respectively. Since the respective delay circuits are connected in series, n/P channel signals of the respective blocks are connected in series to provide a single signal of 1 to n channels which is applied to one image processing circuit to form an image signal.

We claim:

1. An ultrasonic diagnostic apparatus comprising:
   means for transmitting ultrasonic waves to a subject;
   receiving means for receiving echo signals reflected from said subject and dividing receiving signals to deliver them in the form of "K" (K being an integer which is 2 or more) blocks each having a predetermined number of channels;
   selector means for selecting signals corresponding to respective ones of said plurality of blocks from output signals of said receiving means and delivering selected signals;
   signal distributor means for delivering either output signals of said receiving means or output signals of said selector means;
   "K" delay means connected to outputs of said signal distributor means and each having said predetermined channel number;
   means for performing switching between parallel connection and series connection of said "K" delay means;
   means for preparing an image signal from output signals of said delay means; and
   means for displaying said image signal.

2. An ultrasonic diagnostic apparatus according to claim 1, wherein said signal distributor means includes means for selecting the output signals of said receiving means in a mode of single beam reception and selecting the output signals of said selector means in a mode of simultaneous parallel beam reception, and said switching performing means includes means for connecting said delay means in series in the mode of single beam reception and connecting said delay means in parallel in the mode of simultaneous parallel reception.

3. An ultrasonic diagnostic apparatus according to claim 1, wherein said means for transmitting ultrasonic waves to a subject includes a probe of 128 channels, said receiving means includes means for dividing receiving signals to deliver them in the form of two blocks each being of 64 channels, said selector means includes means for selecting either one block of 1 to 64 channel receiving signals or another block of 65 to 128 channel receiving signals from output signals of said receiving means, and said delay means includes two delay means each being of 64 channels.

4. An ultrasonic diagnostic apparatus comprising:
   a probe having n (n being an integer which is 2 or more) channels and operative to transmit ultrasonic waves to a subject and receive echo signals reflected from tissues in said subject;
   receiving means for dividing receiving signals from said probe to deliver them in the form of "P" (P being an integer which is 2 or more) blocks each having n/P channels;
   selector means for selecting signals corresponding to respective ones of said blocks from output signals of said receiving means and delivering selected signals;
   signal distributor means for delivering either output signals of said receiving means or output signals of said selector means;
   "P" delay means connected to outputs of said signal distributor means and each having n/P channels;
   means for performing switching between parallel connection and series connection of said "P" delay means;
   means for preparing an image signal from output signals of said delay means; and
   means for displaying said image signal.

5. An ultrasonic diagnostic apparatus according to claim 4, wherein said signal distributor means includes means for selecting the output signals of said receiving means in a mode of single beam reception and selecting the output signals of said selector means in a mode of simultaneous parallel beam reception, and said switching performing means includes means for connecting said "P" delay means in series in the mode of single beam reception and connecting said "P" delay means in parallel in the mode of simultaneous parallel reception.

6. An ultrasonic diagnostic apparatus comprising:
   a probe having a plurality of channels;
   a receiving circuit for dividing receiving signals from said probe to deliver them in the form of "K" (K being an integer which is 2 or more) blocks each having a predetermined number of channels;
   a selector circuit for selecting signals corresponding to respective ones of said blocks from output signals of said receiving circuit and delivering selected signals;
   a signal distributor for selecting output signals of said receiving circuit in a mode of single beam reception and selecting output signals of said selector circuit in a mode of simultaneous parallel beam reception;
   "K" delay circuits connected to outputs of said signal distributor and each having said predetermined channels; and
   a switch for switching said "K" delay means to series connection in the mode of single beams reception and switching said "K" delay means to parallel connection in the mode of simultaneous parallel beam reception.

* * * * *